Jan. 22, 1952 W. C. HUEBNER 2,583,376
PRECISION MEANS FOR POSITIONING AND INDICATING
THE POSITION OF A MOVABLE MEMBER
Filed Dec. 9, 1950 6 Sheets-Sheet 1

INVENTOR.
WILLIAM C. HUEBNER
BY Hudson, Boughton,
Williams, David & Hoffmann.
ATTORNEYS Jan. 22, 1952 W. C. HUEBNER 2,583,376
PRECISION MEANS FOR POSITIONING AND INDICATING
THE POSITION OF A MOVABLE MEMBER
Filed Dec. 9, 1950 6 Sheets-Sheet 2

INVENTOR.
WILLIAM C. HUEBNER
BY Hudson Boughton,
Williams, David & Hoffmann.
ATTORNEYS

INVENTOR.
WILLIAM C. HUEBNER

INVENTOR.
WILLIAM C. HUEBNER

Patented Jan. 22, 1952

2,583,376

UNITED STATES PATENT OFFICE 2,583,376

PRECISION MEANS FOR POSITIONING AND INDICATING THE POSITION OF A MOVABLE MEMBER

William C. Huebner, Mamaroneck, N. Y.

Application December 9, 1950, Serial No. 199,966

25 Claims. (Cl. 177—311)

This invention relates to precision measurement of linear distances and, more particularly, to a means for accurately indicating the position of a linearly movable part of an apparatus and for facilitating accurate setting of such part at another location a desired linear distance from the indicated position.

An object of the invention is to provide an improved measuring means whereby the position of a linearly movable member or part of an apparatus, such as the slide of a machine tool or the like, can be quickly and easily determined with a precision in the order of 0.0001 of an inch.

Another object of the invention is to provide an improved means for facilitating setting of a linearly movable member or part of an apparatus, such as the slide of a machine tool or the like, to other locations at desired linear distances from a reference position, the accuracy of setting of the member or part in each instance being in the order of 0.0001 of an inch.

A further object of the invention is to provide an improved means for facilitating accurate setting and indication of the position of a linearly movable member or part of an apparatus without the need of end-gauges, gauge blocks, or scales having minutely spaced graduations thereby greatly reducing the time required for precision work in the production of workpieces, in effecting registry of successive images on an image-receiving member, or similar operations.

An aditional object of the invention is to provide an improved device for accurately setting and indicating the position of a linearly movable member or part of an apparatus which device embodies a combination of optical and mechanical elements so constructed and arranged that friction and wear thereof are reduced to a minimum and are substantially eliminated from those parts of the device which affect the accuracy thereof.

A more specific object of the invention is to provide an improved device of the type mentioned above for accurately locating a linearly movable member or part of an apparatus at selected positions relative to a second member or part, the said device comprising a graduated scale mounted on one of the members or parts, a lever having arms of different lengths pivotally supported on the other of said members or parts adjacent said scale with the shorter arm carrying a means successively alignable with the graduations on the scale upon relative movement therebetween, a means for providing calibrated motion-reducing movement of the longer arm of the lever, and a means cooperating with the said means on the shorter arm of the lever providing a sensory perceptible signal in response to alignment of the last-mentioned means with a selected graduation of said scale.

Another specific object of the invention is to provide an improved device of the type mentioned in the preceding paragraph and in which the accurate positioning of the movable member or part to a selected location is visibly indicated on a screen by the magnified juxtapositioned images of an indicium carried by the lever and the graduation of the scale corresponding to the desired location of the member or part.

A still more specific object of the invention is to provide a device of the type mentioned in the two preceding paragraphs and wherein the means for moving the longer arm of the lever is a helical cam surface with graduations adjacent the said surface providing a magnified indication of the extent of movement of the shorter arm of the lever.

The invention further resides in certain novel features of construction and combination and arangements of parts and further objects and advantages will be apparent to those skilled in the art to which the invention pertains from the following description of the present preferred embodiment, and certain modifications thereof, described with reference to the accompanying drawings in which identical parts in the several views are designated by the same reference characters and in which:

The measuring and locating device of this invention may be utilized with a wide variety of different types of apparatus for indicating the position of a linearly movable member or part thereof and then effecting setting of such a member or part to any selected location with reference to the indicated position. The device therefore has a wide range of utility and is not restricted to the uses hereinafter specifically described and illustrated. Thus, while in Fig. 1 of the drawings, the improved measuring and locating device of this invention is shown in operative relationship with the linearly movable slide of a horizontal precision boring machine for indicating the position of the latter and for facilitating setting of the slide to successive selected positions with reference to a selected position, it will be understood that the device may also be used in a similar manner in cooperation with the saddle, which is slidable on the bed, or the head of the machine, which is slidable on the vertical guideway.

Figures 1, 2:
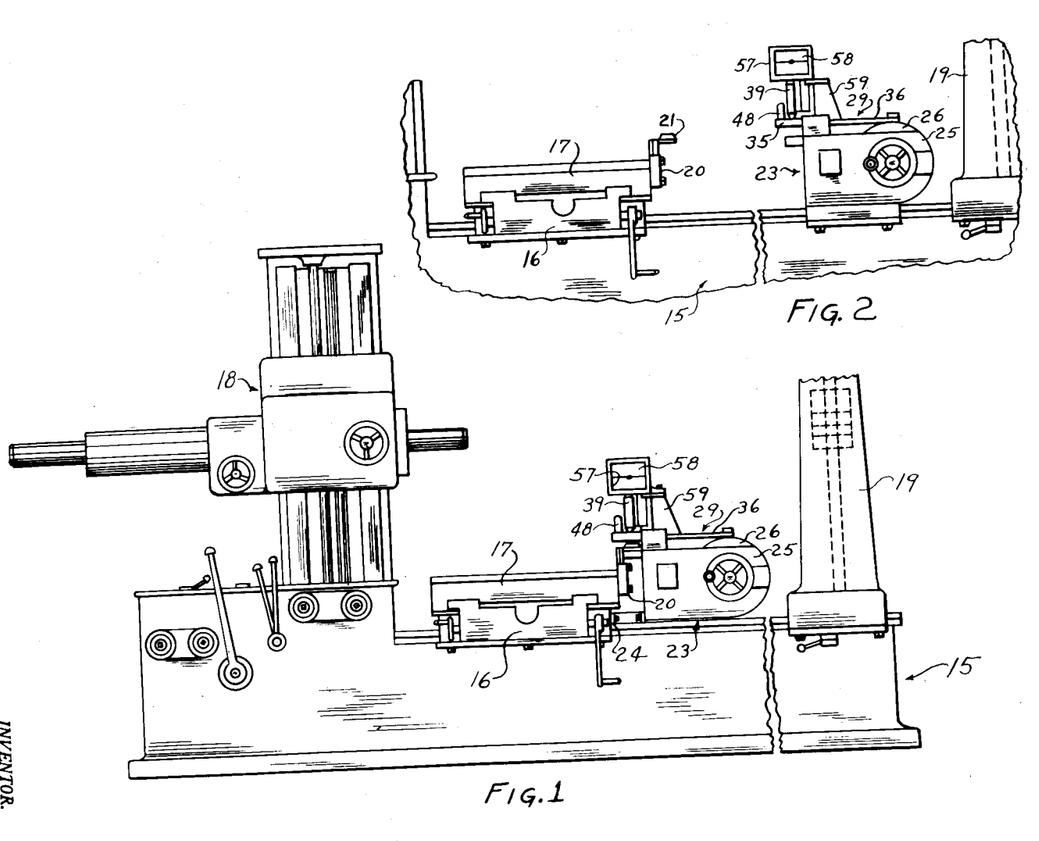
Fig. 1 is a front elevational view of a horizontal boring machine provided with the improved measuring and locating device of this invention with the latter shown supported upon the saddle of the machine in operative position with respect to the movable slide thereof.
Fig. 2 is a fragmentary view of a portion of a horizontal boring machine of the type shown in Fig. 1 with the improved measuring and locating device shown supported upon the bed of the machine rather than upon the saddle thereof.

As shown in Fig. 1 of the drawing, reference numeral 15 designates generally the bed of a conventional horizontal boring machine upon which is provided the usual linearly movable saddle 16 carrying the linearly movable slide 17, the saddle and slide being movable at right angles to each other by conventional means which need not here be described in detail. Adjacent one side of the slide and saddle the bed 15 of the machine is provided with the usual vertical guideway carrying the vertically slidable head 18, while the other end of the bed is provided with the conventional bar support 19.

In accordance with this invention the movable member or part whose successive positions are to be accurately located, in this case the slide 17, has one side thereof provided with a supporting means or bracket 20 extending longitudinally of the slide to which the frame or mounting means 20a for a horizontally extending scale or graduated member 21 is bolted or clamped. The scale or graduated member 21 may be formed in one or a plurality of separate longitudinally aligned pieces extending the length of the slide 17 and provided with spaced graduations 22, see Fig. 7, which are accurately spaced one inch apart. These graduations each have a width in the order of 0.001 inch and are formed as light-transmitting openings through the otherwise opaque scale. Preferably the scale 21 is formed of a plurality of glass plates each having a length in the order of ten inches, which plates are provided with an opaque surface in which the aforementioned graduations 22 are scribed thus forming transparent light-transmitting openings therethrough. The several plates comprising the scale 21 are accurately mounted within the frame or mounting means 20a so that the distance between the centers of adjacent graduations 22 are all the same, this distance being one inch. It will be apparent therefore that the linearly movable part or member, whose position is to be accurately indicated and set, i. e., the slide 17 of the boring machine, carries the scale 21 with it in its movements.

Figure 3:
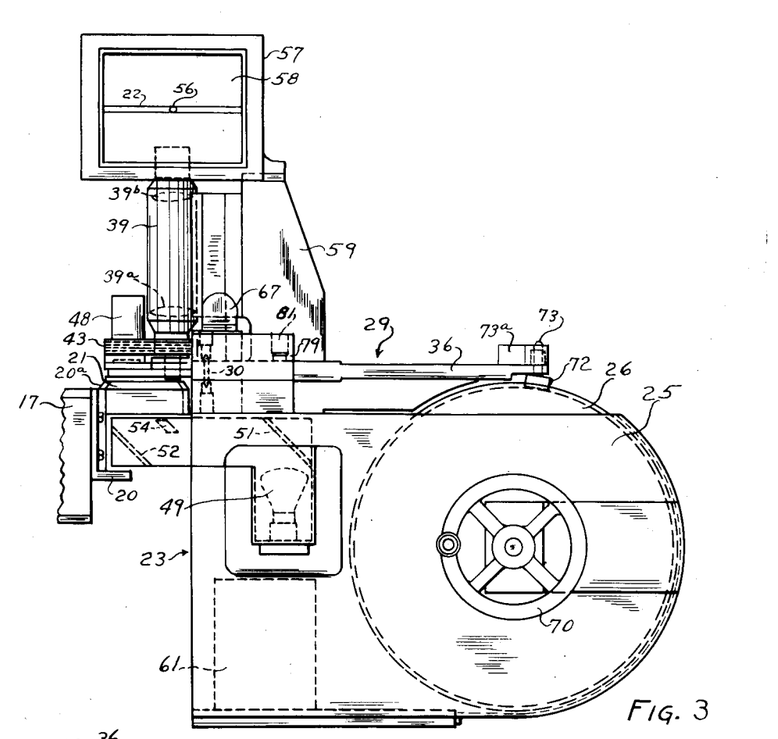
Fig. 3 is a front elevational view of the improved measuring device of this invention detached from the machine with which it is used.

The mechanism cooperating with the aforementioned scale 21 for indicating the location of a graduation thereon relative to a fixed point is provided upon a supporting means, generally designated 23, which is normally stationary with respect to the slide. For this purpose the mechanism may be supported upon the saddle 16 carrying the slide by means of the projecting ears 24 provided on the former and which are normally utilized to support the pin gauges or other conventional measuring devices. As here illustrated, the supporting means 23 comprises a hollow housing 25 in which a drum member 26 is rotatably supported with its axis extending parallel with the direction of movement of the slide 17 and with a portion of the drum projecting above an opening at the top of the housing 25, see Fig. 3.

Figure 4:
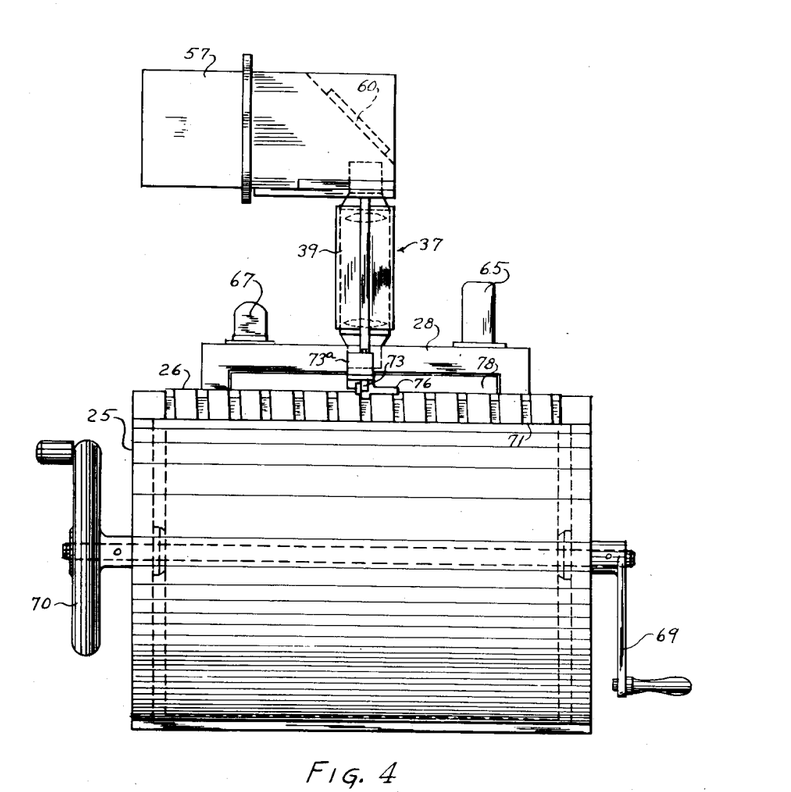
Fig. 4 is a side elevational view of the improved measuring and locating device of this invention as seen from the right-hand side of Fig. 3.
Figure 5:
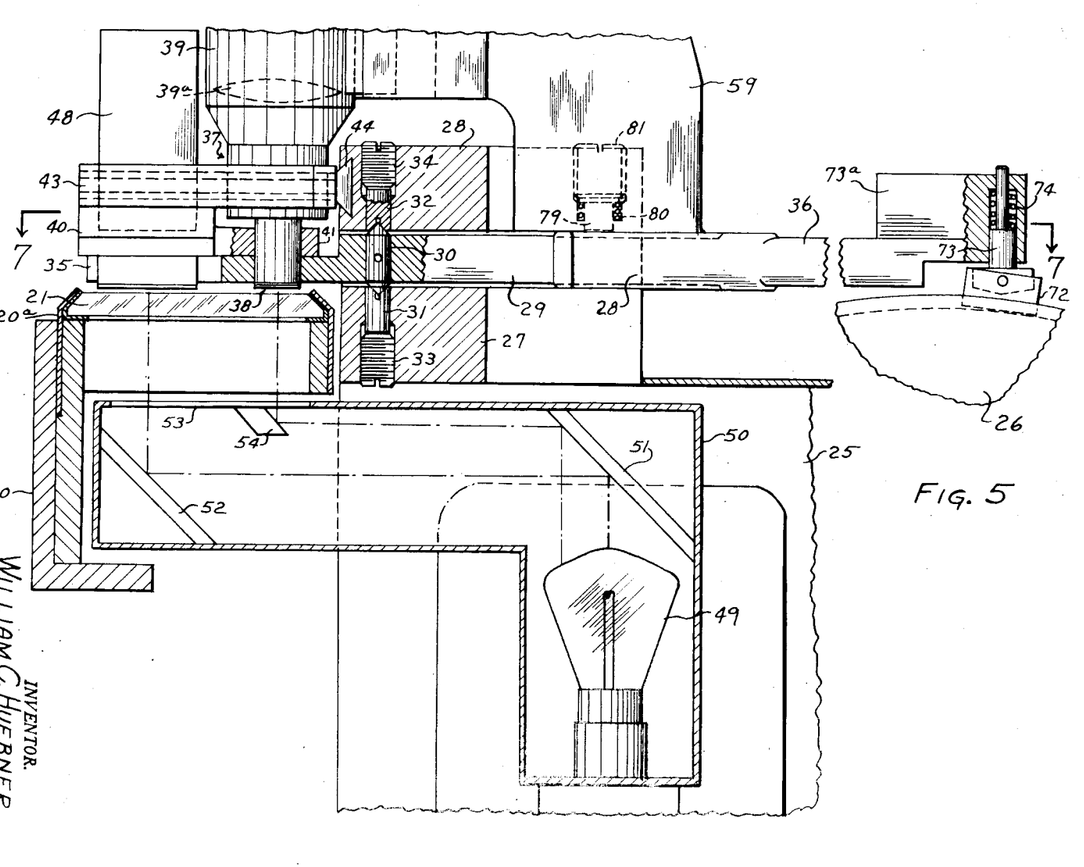
Fig. 5 is an enlarged view, partly in front elevation and partly in section through the measuring and locating device of the invention with the parts shown in section being broken away substantially upon the transverse vertical central plane of the device.

The supporting means 23 is provided on its upper surface with a bearing plate 27 which in turn carries an inverted channel-shaped bearing block 28, the horizontal portion of which is spaced above the plate 27 as will be apparent from an inspection of Figs. 4 and 5. A lever 29 extends through the space thus provided between the plate 27 and the bearing block 28, the lever being supported for rocking movement in a plane parallel with plate 27 by means of a fulcrum pin 30 carried by the lever and having conical ends received in bearing members 31 and 32, see Fig. 5, carried respectively in aligned bores in the bearing plate 27 and the bearing block 28. The bearing members 31 and 32 are adjustably held in place by adjustable set screws 33 and 34, respectively, screwed into the threaded outer ends of the said bores in the bearing plate 27 and bearing block 28. Consequently, the lever 29 is pivoted for movement in a horizontal plane in a manner preventing lost motion or play.

The lever 29 has the two arms 35 and 36 thereof of different lengths, the effective length of the arm 35 being shorter than the arm 36 by a predetermined amount as will hereinafter appear. Intermediate the fulcrum or pivot pin 30 and the outer end of the shorter arm 35, the latter is provided with a vertically extending circular bore in which is positioned the lower end of an optical system, generally designated 37. The housing for this optical system comprises a lower tubular portion 38 received and firmly secured within the aforementioned bore while the upper portion comprises an enlarged housing 39 which may be adjustable relative to the portion 38 for purposes of focusing or the like as will hereinafter be apparent.

Also supported upon the forward or shorter arm 35 of the lever is a member 40 which has a rearwardly extending ear or portion 41 provided with a bore having a rocking fit about the tubular portion 38 of the optical system, this bore being closely fitted to the portion 38 so as to prevent play between the parts while permitting the aforementioned rocking movement. The forward portion of the member 40 has an upstanding part adjacent one edge thereof provided with a dovetail 42 which is slidable in a correspondingly shaped groove extending horizontally within a member 43, see Fig. 6. The member 43 also is provided with a dovetail 44, extending at right angles to the groove for the dovetail 42 with the dovetail 44 being received and slidable within a correspondingly shaped groove provided in the bearing member 28 for the lever. It will be apparent, therefore, that when the lever 29 is rocked about the pivot 30 the member 40 will move in a line which is always parallel with the longitudinal axis of the scale 21 and a distance which is always equal to the displacement of the center of the optical system 37 in a linear direction longitudinally of the scale 21.

The member 40 is provided with a bore extending vertically therethrough above the scale 21 in which bore is mounted a pair of plates 45 and 46 with their adjacent surfaces in spaced parallel relationship extending vertically with respect to the member 40, and at right angles to the graduations 22 upon the scale 21. The space between the plates is equal to the width of a graduation 22 which width is preferably in the order of 0.001 inch. The portion of the lever 29 beneath the member 40 has an opening therethrough permitting the passage of light to the line-space opening between the aforementioned members or plates 45 and 46, this opening in the lever being formed in any suitable manner as, for example, by bifurcating the outer end of the arm 35 of the lever. Above the aforementioned plates 45, 46, and aligned for energization solely by light passing therebetween, is a photoelectric cell 47 which is contained within a housing 48 carried by the member 40.

Beneath the scale 22 is a source of illumination comprising a lamp bulb 49 provided in a housing 50 mounted upon the support 23. Within the housing 50 are reflecting members or surfaces, such as mirrors 51 and 52, for directing the light from the lamp 49 through the housing 50 to and through an opening 53 adjacent the top of the housing at a point beneath the scale 21 in the area over which the lever 29 is rocked. The housing 50 is also provided with an additional reflecting member or surface such as a mirror 54 for directing a portion of the light from the lamp 49 through the graduations 22 of the scale 21 and into the optical system 37.

The tubular portion 38 of the optical system 37 is provided with a transparent disk 55 having a small opaque indicium in the form of a dot 56 centrally of the portion 38, the diameter of this dot preferably being the same as the width of the graduations 22 and hence being in the order of 0.001 inch. Consequently, the light passing through the scale 21 and about the indicium or dot 56 is transmitted upwardly through the enlarged tubular portion 39 into a housing 57 for a screen 58. As shown in the drawings, the screen 58 is preferably translucent and the housing 57 is supported by means of the bracket 59 carried by the longer arm 36 of the lever, the lower portion of the housing 57 having an opening for reception of the enlarged tubular portion 39 of the optical system. Within the housing 57 is a reflecting member or surface 60 such as a planar mirror disposed at an angle with respect to the screen 58 and the tubular portion 39 so that the light projected upwardly as aforementioned is reflected from the mirror 60 upon the screen 58 with the result that the images of the graduation 22 of the scale together with numerals therefor successively appear in juxtaposed relationship with respect to the indicium or dot 56. Within the optical system 37 are suitable magnifying means such as lenses 39a and 39b so that the images of the graduations 22 and of the indicium or dot 56 are considerably enlarged, thereby facilitating observation thereof upon the screen 58.

It will be recalled that the scale 21 is opaque except for the openings comprising the graduations 22 and the numerals therefor while the indicium or dot 56 is opaque and the remainder of the disk 55 is transparent. Consequently, as the scale 21 and lever 29 are moved relative to each other the images of the graduations 22 appear upon the screen 58 as successive horizontal lines of light and sweep vertically over the screen, while the image of the indicium or dot 56 is visible only when the said indicium or dot is coming into or is exactly aligned with a given graduation 22. That is to say, the dot 56 is not visible unless at least a part thereof is directly above a given graduation 22, exact alignment of the dot and a graduation being evidenced by the composite image of a complete black disk within the confines of a band of light substantially equivalent in width to the diameter of the dot, see Fig. 3. Preferably the numerals for the graduations 22 are so placed as to also be successively visible when the indicium or dot 56 is aligned with the corresponding graduation.

Figure 9:
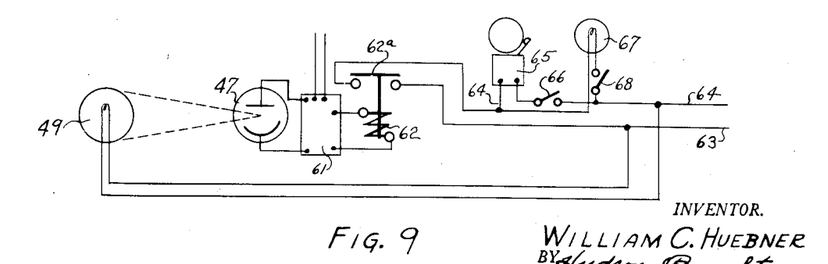
Fig. 9 is a schematic wiring diagram illustrating the electrical circuit for actuating the signal means in response to alignment of one of the scale graduations with the reference means carried on the shorter arm of the lever.

To further facilitate a determination of the aforementioned alignment of the indicium 56 with a graduation 22, as represented by the positioning of the dot 56 when the confines of the image of a graduation 22, sensory perceptible signals are provided in response to passage of light from a graduation between the plates 45 and 46. For this purpose the photoelectric cell 47 is connected in a circuit comprising a conventional amplifier 61 with the output of the latter connected with the coil of a relay 62. The contact 62a of the relay 62 is adapted, when closed, to complete a circuit from one power supply line 63 to a wire 64 connected with one terminal of a buzzer or bell 65, the other terminal of the bell or buzzer 65 being connected with the other power supply line 64 through a disconnect switch 66. Also, the contact 62a is adapted, when closed, to complete a circuit to a lamp bulb 67, connected in parallel with the bell 65, and having a disconnect switch 68 in series therewith for selective disconnection thereof.

It will now be apparent, that in the event both switches 66 and 68 are closed, alignment of the line-space between the plates 45 and 46 with a graduation 22 of the scale 21 will cause light from the lamp 49 to impinge upon the photoelectric cell 47 thereby operating the relay 62 to energize bell 65 and lamp 67 thus providing an audible and visible signal of the alignment. Either or both of these signals may be disconnected, if desired, by means of the switches 66 and 68. It will also be remembered that by virtue of the parallel motion mounting provided for the plates 45, 46 and their connection for movement related to the center of the optical system 37 as a pivotal point, the line-space between the plates 45, 46 is always maintained in alignment with the dot 56 throughout the rocking movement of the lever and consequently the signals are actuated at the same time that the images of the dot and graduation appear in alignment on the screen 58.

The aforementioned drum 26 is provided for the purpose of effecting rocking of the lever 29 during an indicating or setting operation. Therefore, the drum is rotatably mounted within the housing 25 and has a manually operable means connected thereto for effecting rotation thereof. Thus, in the illustrated form of the device a crank 69 and a hand wheel 70 are provided on opposite ends of the axle to which the drum is fixed. The periphery of the drum 26 has a helical cam surface formed thereon which in the preferred embodiment comprises a continuous helical groove 71 having at least ten full convolutions, the pitch of the groove being one inch. Riding within the cam surface or groove is a shoe or follower 72 which is pivoted at the enlarged lower end of a pin 73 carried in a bore at the outer end of the longer arm 36 of the lever. For this purpose, the upper portion of the follower 72 is provided with a rectangularly shaped opening receiving the correspondingly shaped enlarged portion at the lower end of the pin 73 so that the aforementioned rocking motion is effected without play. The pin 73 is, in turn, rockable within its bore, provided in the lever 29 and in a block 73a connected to the latter, about an axis extending at right angles to the pivot for the shoe 72. The shoe is held in proper engagement with the sides and bottom of the cam groove 71 by means of a spring 74 positioned within the bore for the pin 73 and abutting against a shoulder of the latter. It is evident by this construction that rotation of the drum 26 will cause the lever 29 to rock about its pivot during which rocking movement the shoe 72 will follow the drum without lost motion regardless of whether the shoe is on one side or the other of a vertical plane containing the axis of the drum.

Figure 8:
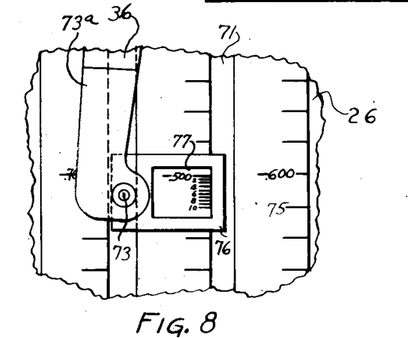
Fig. 8 is an enlarged fragmentary plan view of the end of the longer arm of the lever and of the helical cam surface for moving the latter showing the graduations adjacent the cam surface which cooperate with a vernier carried by the lever.

Adjacent the cam surface or groove 71 the periphery of the drum, preferably the lands thereof, are provided with spaced graduations 75, see Fig. 8, spaced equal distances apart with the distance between adjacent graduations preferably representing 0.001 inch movement of the indicium or dot 56 longitudinally of scale 21. Cooperating with the graduations 75 is a vernier 76 carried by or integral with the shoe 72. In the illustrated embodiment, this vernier has a ractangular opening therethrough provided with a transparent plate 77 carrying the usual vernier graduations for cooperation with the graduations 75 and thereby indicating a reading which is a tenth part of the distance between adjacent graduations on the scale 75.

As mentioned heretofore, the arms 35 and 36 of the lever 29 are of different lengths and preferably these lengths are such that the distance from the center of the pivot 30 to the center of the indicium or dot 56 is one-tenth the distance from the center of the pin 30 to the zero mark on the vernier plate 77. It will therefore be apparent that the drum 26 with its cam groove provides a manually operable motion reducing means for the shorter arm of the lever such that the latter may be accurately positioned and its position indicated with a precision of one part in 10,000. Nevertheless, the graduations for reading such minute distances are enlarged to an extent such that they may be easily read without the need of optical magnification.

Figure 6:
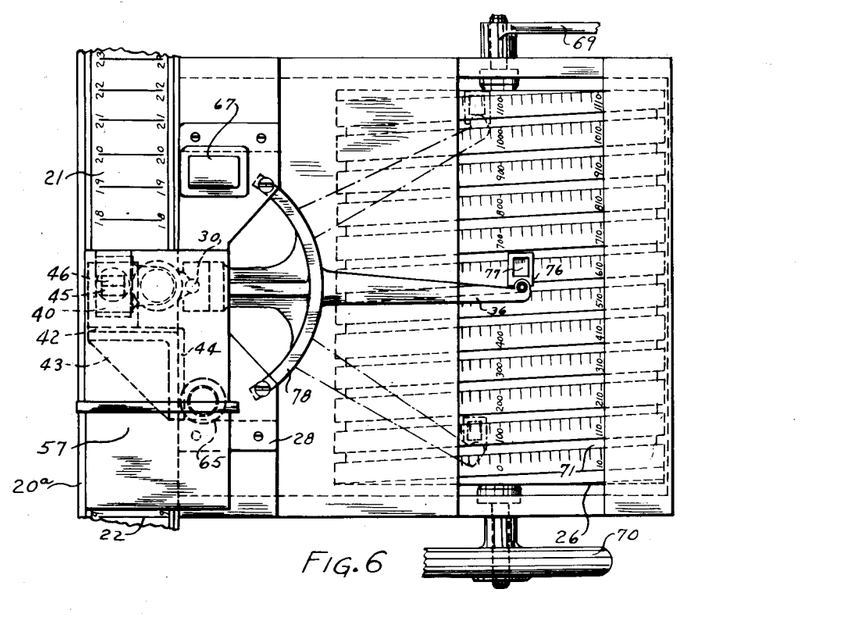
Fig. 6 is a top plan view of the device detached from the machine with which it is used.
Figure 7:
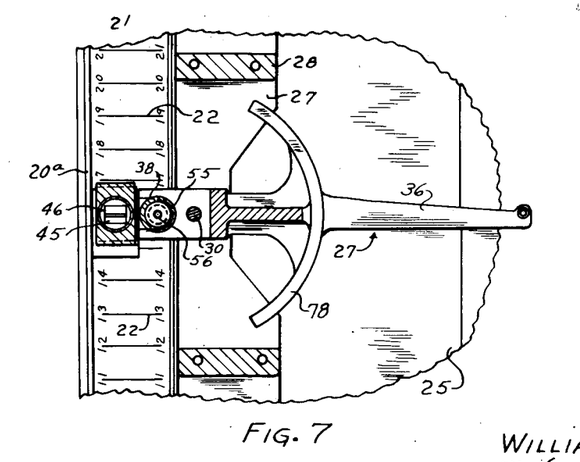
Fig. 7 is a fragmentary sectional view taken substantially on the line 7—7 of Fig. 5 and looking in the direction indicated by the arrows.

The lever 29, in addition to the aforementioned features, is provided with an arcuate portion 78 which is movable between the plate 27 and block 28 to prevent any flexure or tilting of the lever, see Figs. 5-7. This arcuate portion 78 is also employed in conjunction with a locking means to clamp the lever in an adjusted position. For this purpose, two buttons, such as 79, are preferably provided on rearwardly extending portions of the bearing block 28, see also Fig. 6, so that one or the other button is always in cooperation with the arcuate portion 78 of the lever. Each of the buttons 79 has a shoulder adjacent the upper end thereof between which and the bottom of the counterbore for the button is provided a spring 80 normally tending to raise the button from engagement with the lever. The upper portion of the counterbore for each button is threaded and provided with a screw 81 by which the corresponding button 79 may be moved into clamping engagement with the lever, it being understood that when the screw 81 is backed out, the button 79 moves from engagement with the lever under the action of the spring 80.

In employing the device of this invention in conjunction with a horizontal boring machine, the work is first placed upon the slide 17, the initial or starting point with respect to the operations to be performed upon the workpiece is accurately determined with respect to the tool spindle, and the work is then clamped in place, as is well understood in the art. The operator then manipulates the drum 26 to align the indicium or dot 56 with the adjacent graduation 22 on the scale as will be evidenced by their juxtapositioned images upon the screen 58. This alignment will also be indicated by the audible or visible signals as a result of the simultaneous aligning of the space between the plates 45 and 46 with the same graduation 22. The position of the device as thus determined is then read from the graduations 75 upon the drum 26 in conjunction with the vernier plate 77 and this reading represents the reference or beginning point for the succeeding operations.

Let it be assumed that the position thus read is represented by a reading on the scale 21 of 7 and a reading on the drum of .5625, so that the combined reading is 7.5625. Now let it be assumed that the next position of the workpiece is to be exactly 3.2500 inches from the initial position. The corresponding reading obtained from the graduations should then be 10.8125. Consequently, the operator now rotates the drum 26 so that the reading thereon as observed at the vernier is now .8125. This movement of the drum will of course have rocked the lever 29 so that the shorter arm bearing the indicium or dot 56 and the plates 45, 46 has now taken up a new location with respect to the scale 21. After thus positioning the lever, the latter is locked in place by operation of one or the other of the screws 81. At this time the indicium or dot 56 and the photoelectric cell 47 will no longer be aligned with one of the graduations 22, but in the assumed example will have moved to a position in advance of the graduation numbered 7 upon the scale 21.

The operator now operates the slide 17 thereby moving the work and the scale 21 relative to the lever 29. As the slide is thus moved the graduations 22 successively pass beneath the indicium 56 and the opening provided between the plates 45 and 46. The first of the graduations 22 to thus pass, in the assumed example, is that numbered 7. The alignment of the graduation with the space between the plates 45, 46 actuates the photoelectric cell causing operation of the bell 65, light 67 or both, depending upon whether the switches 66 and 68 are open or closed. At the same time that the signals are actuated the band of light representing this graduation will be so positioned upon the screen 58 that the image of the dot 56 will be visible and exactly centered therein. The distance the slide 17 has moved is exactly the decimal part of the desired distance to the new setting, namely, 0.2500 of an inch. As the operator continues to move the slide 17, the graduations 22 will successively align with the opening between the plates 45, 46 providing corresponding sequential actuation of the signals, thus indicating that the graduations numbered 8, 9 and 10 on the scale 21 have been successively reached. During this movement the graduations 22 passed over will also be represented by bands of light successively sweeping vertically across the screen 58 and at each time that the signals are received, the corresponding band and the image of dot 56 will be in alignment.

When the signal corresponding to the graduation numbered 10 on the scale 21 has been thus reached, movement of the slide 17 is stopped. In all probability the slide will have traveled a little too far as a result of such operation due to the inability of the operator to stop precisely when the signal is received especially when a relatively large movement is being effected. He will then return the slide 17 past the position at which the signal or signals are received corresponding to the graduation numbered 10 and then very slowly advances the slide 17 at the same time observing the screen 58 for appearance of the image of the dot 56 with respect to the band of light corresponding to this graduation. At the time when the slide has again exactly reached the position corresponding to graduation numbered 10, the image of the dot 56 will be exactly centered with respect to the image of this graduation, its numeral will be visible and the signals will again be actuated, thus indicating that the workpiece has now been moved the exact preselected distance 3.250 inches from its initial position.

Let it be assumed that the next operative position of the slide 17 is to be a distance of 2.3000 inches from the position to which the slide has just been set and which latter position is represented by a reading of 10.8125. The new position will then correspond with a reading of 13.1125. The operator now loosens the locking screw or screws 81 and rotates the drum 26 in the reverse direction to that previously moved until the vernier 77 is located relative to graduations 75 at a position indicating the numerals .1125. The arm 35 of the lever 29 will then have moved the indicium 56 and the space between plates 45 and 46 from alignment with the graduation on scale 21 numbered 10. The operator then clamps the lever 29 in place by tightening the screw or screws 81 and then moves the slide 17 until the graduation numbered 13 is properly aligned with the indicium 56 and the photoelectric cell 47 during which movement the graduations numbered 11 and 12 will also have successively actuated the signal means. Hence, when the signal means is actuated the third time, upon alignment with the graduation on scale 21 numbered 13, the operator then slowly positions the slide 17 as aforementioned into exact alignment with that graduation which is evidenced by the alignment of the image of the indicium or dot 56 with the image of the graduation upon the screen 58. This then represents the exact position of the slide for the new setting 13.1125 and which is the result of moving the work exactly 2.3000 inches from its previous position.

While examples of but two settings have been given, it will be apparent that any desired number of exactly determined positions of the slide may be effected, it being noted that the setting of the lever 29 for any new position or setting may be effected while the boring machine is performing the boring operation at the previous setting of the slide since the lever 29 is not physically connected to the slide. The prior setting of the lever 29 reduces lost time of the machine which is also further materially reduced by the greater speed of setting achieved by the ease of reading the device. Also while the device has been described with reference to positioning the slide, similar measuring devices may also be provided, as heretofore mentioned, for the head 18 and the saddle 16 to facilitate accurate setting of these elements.

In the aforementioned embodiment the novel measuring device was described as being carried upon the saddle 16. As a modification of such construction, a measuring and locating mechanism as just described can alternatively be fixedly mounted upon the bed adjacent the rear thereof as indicated in Fig. 2, so that the scale 21, carried by the slide, may be spaced from the main portion of the measuring device upon movement of the saddle 16 and slide 17 to an operative position with respect to the head 18. In such an arrangement the saddle 16 may be moved to bring the scale 21 into cooperation with the lever 29 and optical system 37 for effecting indicating of the position of the slide and setting the latter to a new location in the manner previously described. After such setting the slide is clamped to the saddle and the saddle then moved back into cooperative relationship with the head 16 and tools carried thereby for performing a new boring operation, the position of the parts at this time being substantially as shown in Fig. 2. When the slide is to be set to a new location the carriage 16 is again returned to its rearward position, aligning the scale 21 with the lever of the measuring device for a new setting as will now be readily apparent.

Figures 10, 11, 13:
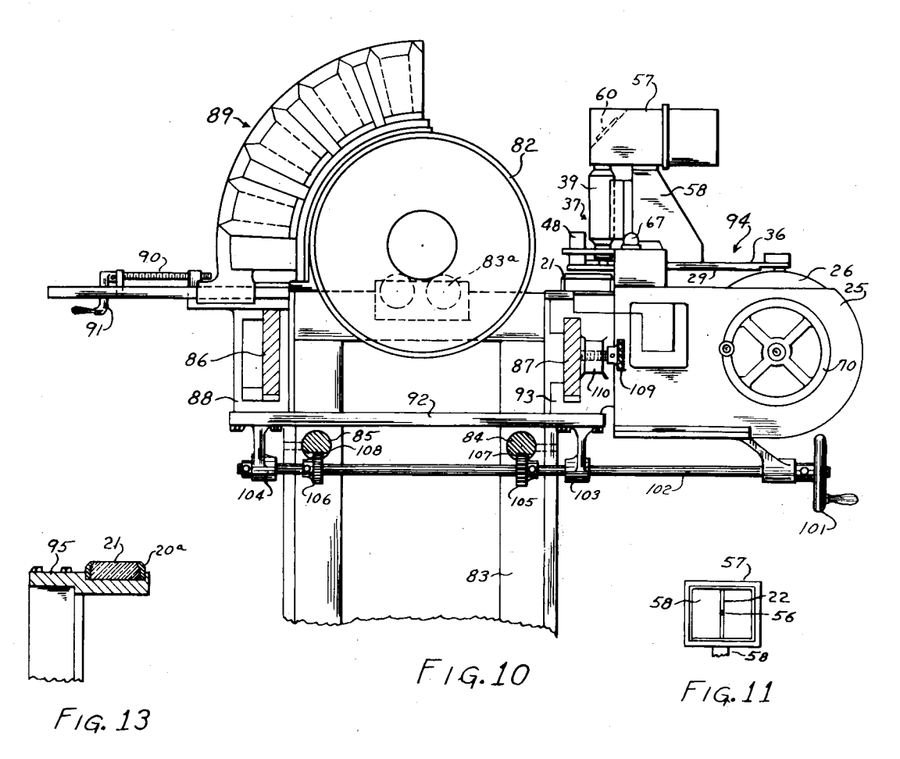
Fig. 10 is a transverse vertical sectional view through an apparatus for positioning an image-producing member relative to an image receiving member, similar to that shown in the Huebner Patent 2,091,280, with the improved measuring and locating device of this invention applied thereto.
Fig. 11 is a detached front elevational view of the screen of the indicating mechanism for the device shown in Fig. 10.
Fig. 13 is a transverse sectional view taken substantially on the line 13—13 of Fig. 12.
Figure 12:
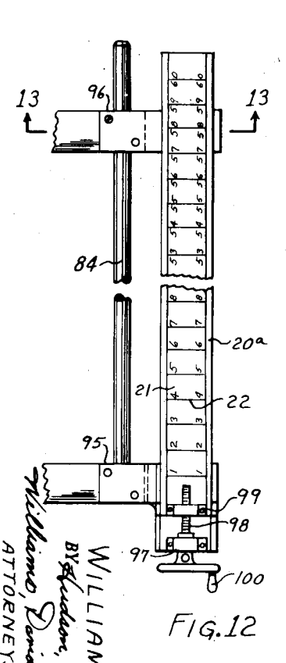
Fig. 12 is an enlarged detached elevational view of the graduated scale member shown in Fig. 10 illustrating the means for adjusting the position of the latter.

Another embodiment of the measuring device of this invention is illustrated in Figs. 10 through 13. In this form of the invention the device is utilized for effecting exact predetermined registry of an image or images upon an image receiving member. For example, as shown in Fig. 10, a cylinder 82 may be prepared for use as one element of a printing couple in printing operations by photographically reproducing one or more images upon the cylinder, which images are in exact predetermined register upon different longitudinal portions of the cylinder. To effect this result, an image producing means is supported for movement longitudinally of the cylinder and the novel measuring and locating device cooperates therewith to rapidly and accurately indicate the position thereof relative to the cylinder. Hence, accurate setting of the image producing means to provide an image or images upon the cylinder at a desired location or locations relative to a reference position is greatly facilitated.

The structure by which the cylinder is so supported and the images reproduced thereon are substantially the same as disclosed in Patent No. 2,091,280 issued to William C. Huebner on August 31, 1937 and hence need not be here illustrated and described in detail, reference being made to the said patent for details of the construction not here shown and set forth. It is sufficient for the present purpose to note that the apparatus comprises a supporting framework having a stationary end support member or pedestal 83 having rollers 83a adjacent the top for supporting one end of the axle of the cylinder 82. A second end support member or pedestal, not shown, similar to 83 and movable towards and from the latter provides support for the other end of the axle of the cylinder, the supports or pedestals being movable to accommodate cylinders of different lengths. The two end members or pedestals are mounted upon a common bed and connected by a plurality of horizontally extending rods such as 84 and 85 to insure exact parallel motion of the movable end member or pedestal. Adjacent the top and at one side of the support or pedestal 83 is a longitudinally extending bar 86 which is rigidly connected with the support or pedestal 83 and is slidably supported on the aforementioned movable support or pedestal. A similar bar 87 is correspondingly supported adjacent the top on the other side of the supports or pedestals, so that the two bars 86 and 87 extend in longitudinal parallel relationship on opposite sides of the apparatus.

In accordance with this invention, the bars 86 and 87 slidably support a framework carrying both the measuring device and the image producing means. This framework comprises a first bracket member 88 which supports a means 89 for producing a photographic image upon a portion of the cylinder 82. This image producing means 89 includes a housing having a plurality of lights and a holder for an image transparency or the like, all as is fully illustrated and described in the aforementioned patent, and hence need not be here repeated in detail. The image producing means 89 can be moved radially to and from the periphery of the cylinder by a screw 90 and operating crank 91 as is also described in the Patent No. 2,091,280.

The lower portion of the bracket 88 is connected with a transversely extending plate 92 the other end of which is similarly connected to a bracket member 93 slidable upon the bar 87. Carried by the bracket 93 is a measuring device, generally designated 94, which is constructed in the same manner as that previously described with respect to the measuring device used with the boring machine, the only difference being in the position of the screen. This device 94 therefore comprises the same drum 26 with the graduated helical cam groove 31 for moving the lever 29 the shorter or forward arm of which lever carries the optical system 37 and the parallel plates for successive alignment with graduations upon a scale 21 as will now be readily understood.

In the instant embodiment, however, the scale 21 is preferably adjustably supported upon the supports or pedestals such as 83. This is effected, see Fig. 12, by slidably supporting the scale frame 20a in spaced brackets 95, 96 carried by the pedestals or supports such as 83, the bracket 85 having a threaded member 97 secured thereto through which extends an adjusting screw 98 with the latter threadably received in a threaded end block 99 attached to the scale frame 20a. The screw 98 is rotatable within the block or lug 97 and prevented from endwise movement with respect thereto, the screw 98 being rotated to effect adjustment of the scale by means of a hand wheel or crank 100 secured to the screw.

Movement of the image producing means 89 and the measuring device 94 is effected by means of a crank or hand wheel 101 which is secured to the end of a shaft 102 supported by bearings 103 and 104 carried by the plate 92. The shaft 102 is provided with pinions 105 and 106 cooperating with racks 107, 108 formed upon or attached to the horizontally extending supporting bars 84, 85 of the apparatus, the racks preferably extending substantially the entire length of these rods 84, 85. Consequently, by turning the hand wheel 101 the image producing means 89 and the measuring device 94 are simultaneously moved longitudinally of the image receiving cylinder 82. The two devices 89 and 94 may be locked in an adjusted position by means of a clamping screw 109 threaded in a boss or lug 110 on the bracket 93 and engageable with the bar 87.

In employing the apparatus in the form shown in Figs. 10-13, a cylinder 82 on which the images are to be produced is placed upon the bearings carried by the pedestals or supports 83 and the cylinder is then rotated to a predetermined circumferential position by means not here shown but which is fully disclosed in the aforementioned patent. At this time the image producing means 89 will be spaced radially from the cylinder 92. The operator now operates the crank or hand wheel 70 of the measuring device to locate the lever 29 at conventional position which is preferably substantially its middle or median position when the indicium or dot 56 is aligned with one of the graduations 22 on the scale 21, as will be indicated on the screen 58. If this alignment is not secured at the desired initial position of the lever 29 the scale 21 may be shifted longitudinally slightly by means of the hand wheel 100 and screw 98 positioning graduation 22 exactly in alignment with the indicium 56. The readings from the scale 21, the drum graduations 75 and the vernier 77, taken together, then constitute the reading for the initial position of the image producing means 89 relative to the cylinder 82. Preferably this initial position, for producing the first image thereon on the cylinder, will be such that the edge of the image is adjacent one edge of the cylinder but spaced therefrom, the amount of this spacing not ordinarily being critical.

The screw 90 is then operated to move the image producing means 89 into operative relationship with the cylinder 82 and an image is produced upon the latter in the manner which is fully described in the aforementioned patent. The image producing means 89 is next moved radially away from the cylinder 82 by means of the screw 90 when it is desired to effect a second image upon the drum in preselected spaced relationship with respect to the first image.

Let it be assumed that the reading of the measuring device corresponding with the first image position was 1.5000 and that the new location is to be exactly 6.0000 inches from the first location with an accuracy of one part in ten thousand. The new reading must then be 7.5000. It is therefore unnecessary to move the drum 26 since the image producing means is to be set at exactly six full divisions of the scale 21 from its present position at which the indicium 56 is now in alignment with the graduations numbered 1, the decimal part of the reading being obtained from the drum and vernier. The operator will now loosen the clamping screw 109 and operate the crank 101 thereby moving the image producing means 89 and the measuring means 94 simultaneously longitudinally of the drum through operation of the pinions 105, 106. During this movement the signal means 65 and 67 are successively actuated by each of the six graduations 22 passed over and the operator terminates movement of the image producing means and measuring device when the sixth such signal is perceived and which signal is produced by the graduation numbered 7. In the event the image of the indicium 56 is not exactly aligned with the image of this graduation upon the screen 58, due to the operator having moved the mechanism slightly too far, he may return the same beyond the graduation numbered 7 and move it slowly forwardly until the latter is properly aligned as will now be apparent. The screw 109 is then clamped, holding the mechanism in its new position whereupon the crank 91 is operated causing the screw 90 to move the image producing means 89 radially into cooperating relationship with the cylinder 82 for the production of a new image upon the cylinder at the predetermined location.

Similar operations are performed for each succeeding image that is to be formed upon the cylinder. As a further example thereof, let it be assumed that the next image is to be at a position such that the image producing means will be a distance of 6.8750 inches from its present position. The new readings upon the scale 21, drum 26 and vernier 77 will then be 14.3750. The operator will then actuate the hand wheel 70 to position the drum 26 so that the reading of the graduations 75 in conjunction with the vernier 77 will be .3750. Then the clamp 109 is loosened, the image producing means 89 backed radially from the drum and the crank 101 moved until the successive actuations of the signal means indicate that the operator now has the device properly positioned in alignment with graduation numbered 14 whereupon the apparatus is again clamped and the image produced upon the cylinder 82 as previously described.

In the form of the measuring device illustrated in Fig. 10, the screen 58 is turned through 90° with respect to the showing in Figs. 1–4. This is for the convenience of the operator since in the present form of the device he will no doubt normally stand at the right of the mechanism, as illustrated in Fig. 10, whereas in conjunction with a boring machine he will no doubt stand in front of the machine, that is in front of the structure as illustrated in Fig. 1. The construction of the optical system with its reflecting mirror and screen is not changed from that shown previously, but due to the position of the mirror 60 and the screen 58 with respect to the scale 21, the image of the graduations 22 now extend at right angles to the direction in which they previously extended. That is to say, in the form of the mechanism shown in Figs. 1–4, the images of the graduations 22 extended horizontally across the screen 58 and appeared to move vertically of the screen. In the form of the mechanism shown in Figs. 10–11, the images of the graduations 22 will now appear vertically of the screen 58 and will seem to move transversely of the screen. The alignment effected between a given graduation and the indicium or dot 56 as evidenced by the superpositioning of their images is not altered by this change and hence the operation of the device is not altered.

While the invention has been illustrated and described primarily with reference to two different uses thereof, it will be readily understood that the invention may be put to numerous other uses for measurement and accurate location of the positions of linearly movable parts and is not restricted to use with horizontal boring machines or image locating mechanism for photographically reproducing images on a printing member. Moreover, variations may be effected in certain of the details of the device without altering its basic principles of operation. Therefore, the foregoing description and the accompanying drawings are intended only as illustrative of certain embodiments of the invention and not as limitations thereon except as required by the spirit and scope of the appended claims.

Having thus described the invention, I claim:

1. A device of the character described for indicating the position of a linearly movable part comprising means providing a graduated scale, a lever, means pivoting the lever for movement of one of the arms thereof adjacent said scale, one of said means being connected to said movable part to move therewith relative to the other of said means, an indicium on said one arm, an optical system providing an enlarged image of at least a portion of said scale and said indicium in juxtaposition, motion reduction lever-moving means cooperating with the other arm of said lever, and means indicating the extent of movement of said lever-moving means thereby providing an amplified measurement of the movement of said indicium necessary to align the image of the latter with the image of a selected graduation on said scale.

2. A device of the charatcer described for indicating the position of a linearly movable part comprising a first supporting means fixed to said part for movement therewith, a second supporting means normally stationary with respect to said part, a graduated scale mounted upon one of said supporting means, a lever pivotally carried by the other of said supporting means, the said lever having arms of different lengths with the shorter arm movable adjacent said scale, an indicium on said shorter arm, means for illuminating said scale, a screen, a magnifying means intermediate the said screen and scale arranged to project an enlarged image of a selected portion of said scale and indicium upon said screen in juxtaposition, means cooperating with the longer arm of said lever to effect movement thereof, and means indicating the extent of movement of said lever-moving means thereby providing an amplified measurement of the movement of said indicium necessary to align the image of the latter with the image of a selected graduation on said scale.

3. A device as defined in claim 2 wherein the said magnifying means and screen are mounted upon the shorter arm of said lever and so arranged relative to said indicium that the image of the latter appears at a predetermined position upon said screen.

4. A device of the character described for indicating the position of a linearly movable part comprising a first supporting means fixed to said part for movement therewith, a second supporting means normally stationary with respect to said part, a graduated scale mounted upon one of said suporting means, a lever pivotally carried by the other of said supporting means, the said lever having arms of different lengths with the shorter arm movable adjacent said scale, an indicium on said shorter arm, an optical system providing an enlarged image of at least a portion of said scale and said indicium in juxtaposition, means comprising a rotatable helical cam surface cooperating with the longer arm of said lever to effect movement thereof, and means indicating the extent of movement of said cam surface in moving said lever thereby providing an amplified measurement of the resulting movement of said indicium necessary to align the image of the latter with the image of a selected graduation on said scale.

5. A device as defined in claim 4 wherein the said helical cam surface is a multiple convolution groove upon a rotatable drum the axis of which extends transversely of the said lever.

6. A device as defined in claim 4 and wherein the said longer arm of the lever has a cam follower pivotally supported thereon and cooperating with said cam surface for transmitting movement of the latter to the lever.

7. A device of the character described for indicating the position of a linearly movable part comprising a first supporting means fixed to said part for movement therewith, a second supporting means normally stationary with respect to said part, a graduated scale mounted upon one of said supporting means, a lever pivotally carried by the other of said supporting means, the said lever having arms of different lengths with the shorter arm movable adjacent said scale, an indicium on said shorter arm, an optical system providing an enlarged image of at least a portion of said scale and said indicium in juxtaposition, means comprising a helical cam surface having a plurality of convolutions cooperating with the longer arm of said lever to effect movement thereof, graduations adjacent the convolutions of said cam surface, and means on the longer arm of said lever cooperating with the graduations adjacent the cam surface to provide an amplified measurement of the resulting movement of said indicium necessary to align the latter with the image of a selected graduation on said scale.

8. A device as defined in claim 7 wherein the means on the said longer arm of the lever cooperating with the said graduations adjacent the helical cam surface includes graduations carried by said lever providing a vernier scale with respect to the graduations adjacent the cam surface.

9. A device of the character described for indicating the position of a linearly movable part comprising a first supporting means fixed to said part for movement therewith, a second supporting means normally stationary with respect to said part, a graduated scale carried by one of said supporting means, a lever pivotally carried by the other of said supporting means, the said lever having arms of different lengths with the shorter arm movable adjacent said scale, an indicium on said shorter arm, a screen, an optical means providing an enlarged image of at least a portion of said scale and said indicium in juxtaposition on said screen, a drum rotatably mounted upon said other supporting means and provided with a helical cam surface on the exterior thereof, a member operatively engaged with said cam surface and pivotally supported on said lever to effect movement thereof when the drum is rotated, graduations on said drum adjacent the said cam surface, and means on said pivotally supported member cooperating with the graduations of said drum to provide an amplified measurement of the movement of said indicium necessary to align the latter with the image of a selected graduation on said scale.

10. A device of the character described for indicating the position of a linearly movable part comprising a first supporting means fixed to said part for movement therewith, a second supporting means normally stationary with respect to said part, a graduated scale carried by one of said supporting means, a lever pivotally carried by the other of said supporting means, the said lever having arms of different lengths with the shorter arm movable adjacent said scale, an indicium on said shorter arm, an optical system including magnifying means and a screen carried by said lever to provide an enlarged image of at least a portion of said scale and said indicium in juxtaposition on said screen, a grooved drum, means rotatably mounting the drum in said other supporting means with the axis of the drum extending transversely of said lever, a member riding in the groove of said drum and pivotally supported by the longer arm of said lever, means to rotate said drum thereby effecting movement of said lever, graduations on said drum adjacent said groove, and means on the lever cooperating with graduations on said drum to thereby provide an amplified measurement of the resulting movement of said indicium necessary to align the latter with the image of a selected graduation on said scale.

11. A device of the character described for accurately locating a linearly movable part at a predetermined position, comprising a first supporting means fixed to said part for movement therewith, a second supporting means normally stationary with respect to said part, a graduated scale mounted on one of said supporting means, a lever pivotally carried by the other supporting means, said lever having one arm movable adjacent said scale, means on said one arm successively alignable with the graduations on said scale upon relative movement therebetween, means providing a sensory perceptible signal in response to said alignment, means cooperating with the other arm of said lever to effect movement thereof, and means indicating the extent of movement of said lever-moving means thereby providing an amplified indication of the position of the one arm of the lever as the result of operation of said lever-moving means, whereby the said movable part may be accurately set to a predetermined position by setting the said one arm of said lever in accordance with the desired position by operation of said lever-moving means and then moving the said part until the said signal producing means is actuated in response to alignment of the means on the said one arm of the lever with that graduation on said scale corresponding with the said predetermined position of the part.

12. A device as defined in claim 11 and wherein the said signal providing means is light responsive and the said scale and the means in the shorter arm of the lever jointly cooperate to selectively permit and prevent passage of light to said signal providing means thereby controlling operation of the latter.

13. A device of the character described for accurately locating a linearly movable part at a predetermined position, comprising a first supporting means fixed to said part for movement therewith, a second supporting means normally stationary with respect to said part, a graduated scale carried by one of said supporting means, a lever pivotally carried by the other of said supporting means, said lever having arms of different lengths with the shorter arm movable adjacent said scale, means on said shorter arm successively alignable with the graduations on said scale upon relative movement therebetween, means providing a sensory perceptible signal in response to said alignment, means comprising a rotatable helical cam surface cooperating with the longer arm of said lever to effect movement thereof and graduations adjacent the helical cam surface cooperating with said lever to provide an amplified indication of the position of the shorter arm of the lever as the result of rotation of said cam surface, whereby the said movable part may be accurately set to a predetermined position by setting the shorter arm of said lever in accordance with the desired position as indicated by the graduations adjacent the cam surface and then moving the said part until the said signal producing means is actuated in response to alignment of the means on the shorter arm of the lever with that graduation on said scale corresponding with the said predetermined position of the part.

14. A device of the character described for accurately locating a linearly movable part at a predetermined position, comprising a first supporting means fixed to said part for movement therewith, a second supporting means normally stationary with respect to said part, a graduated scale mounted on one of said supporting means, a lever pivotally carried by the other of said supporting means, said lever having arms of different lengths with the shorter arm movable adjacent said scale, means on said shorter arm successively alignable with the graduations on said scale upon relative movement therebetween, means providing a sensory perceptible signal in response to said alignment, a rotatable means provided with a helical cam surface cooperating with the longer arm of said lever to effect movement thereof, the pitch of said cam surface and the ratio of said lever arms being such that the said shorter arm of the cam is moved a distance equal to the spacing between two graduations on said scale, and graduations adjacent the cam surface representative of fine divisions of the space between two graduations on said scale and cooperating with said lever to provide an amplified indication of the position of the shorter arm of the lever, whereby the said movable part may be accurately set to a predetermined position by moving the cam surface until the graduations cooperating with the said lever indicate that the shorter arm of the lever is located in accordance with the desired position and then moving the said part until the said signal producing means is actuated in response to alignment of the means on the shorter arm of the lever with that graduation on said scale corresponding with the said predetermined position of the part.

15. A device as defined in claim 14 wherein the longer arm of said lever is provided with graduations cooperating with the graduations adjacent the said cam surface in a manner such as to provide a venier for the latter.

16. A device of the character described for accurately locating a linearly movable part at a predetermined position, comprising a first supporting means fixed to said part for movement therewith, a second supporting means normally stationary with respect to said part, a graduated scale mounted on one of said supporting means, a lever pivotally carried by the other of said supporting means, said lever having arms of different lengths with the shorter arm movable adjacent said scale, means on said shorter arm successively alignable with the graduations on said scale upon relative movement therebetween, means providing a sensory perceptible signal in response to said alignment, an indicium on said shorter lever arm, an optical system providing an enlarged image of at least a portion of said scale and said indicium in justaposition, means cooperating with the longer arm of said lever to effect movement thereof, and means indicating the extent of movement of said lever-moving means to provide an amplified indication of the position of the shorter arm of the lever, whereby the said movable part may be accurately set to a predetermined position by setting the shorter arm of said lever in accordance with the desired position by operation of said lever-moving means and then moving the said part until the said signal producing means is actuated in response to alignment of the means on the shorter arm of the lever with that graduation on said scale corresponding with the said predetermined position of the part at which time the images of said calibration and indicium are also aligned.

17. A device as defined in claim 16 and wherein the said signal producing means is light responsive and the said optical system includes a means illuminating said scale, a screen, and magnifying means intermediate the said screen and scale arranged to project an enlarged image of a selected portion of said scale and indicium upon said screen.

18. In combination with an apparatus having a first part supported for linear movement with respect to a second part, a graduated scale fixed to one of said parts, a lever pivotally carried by the other of said parts, the said lever having one arm thereof movable adjacent said scale, means on said one arm successively alignable with the graduations on said scale upon relative movement therebetween, means providing a sensory perceptible signal in response to said alignment, manually operable motion-reduction means cooperating with the other arm of said lever to effect relatively small movements of the lever in response to larger movements of the manually operable means, and means indicating the extent of movement of the manually operable means thereby providing an amplified indication of the position of the said one arm of the lever, whereby the said first part of the apparatus may be accurately set to a predetermined position by actuating said manually operable means until the said one arm of said lever is located in accordance with the desired position and then moving the said first part until the signal producing means is actuated in response to alignment with the first-mentioned means of that graduation on said scale corresponding with the said predetermined position of the first part.

19. In combination with an apparatus having a first part supported for linear movement with respect to a second part, a graduated scale fixed to one of said parts, a motion reduction means including a first portion movable adjacent said scale and a second portion operatively connected to said first portion for effecting reduced movement of the former in response to movement of the latter, an indicium on said first portion successively alignable with the graduations on said scale upon relative movement therebetween, an optical system providing an enlarged image of at least a portion of said scale and said indicium in juxtaposition, and means indicating the extent of movement of said second portion of said motion reducing means thereby providing an amplified indication of the position of the indicium, whereby the said first part of the apparatus may be accurately set to a predetermined position by actuating said motion reduction means until the said first portion thereof is located in accordance with the desired position and then moving the said first part until the optical system reveals alignment with the said indicium of that graduation on said scale corresponding with the said predetermined position of the first part.

20. In combination with an apparatus having a first part supported for linear movement with respect to a second part, a graduated scale fixed to one of said parts, a lever pivotally carried by the other of said parts, the said lever having arms of different lengths with the shorter arm movable adjacent said scale, an indicium on said shorter arm successively alignable with the graduations on said scale upon relative movement therebetween, an optical system providing an enlarged image of at least a portion of said scale and said indicium in juxtaposition, manually operable motion reduction means cooperating with the longer arm of said lever to effect movement thereof, and means indicating extent of movement of said manually operable means thereby providing an amplified indication of the position of the shorter arm of the lever, whereby the said first part of the apparatus may be accurately set to a predetermined position by actuating said manually operable means until the shorter arm of said lever is located in accordance with the desired position and then moving the said first part until the optical system reveals alignment with the said indicium of that graduation on said scale corresponding with the said predetermined position of the first part.

21. In combination with an apparatus having a first part supported for linear movement with respect to a second part, a graduated scale fixed to one of said parts, a lever pivotally carried by the other of said parts, the said lever having arms of different lengths with the shorter arm movable adjacent said scale, means on said shorter arm successively alignable with the graduations on said scale upon relative movement therebetween, means providing a sensory perceptible signal in response to said alignment, an indicium on said shorter lever arm, an optical system providing an enlarged image of at least a portion of said scale and said indicium in juxtaposition, manually operable motion reduction means cooperating with the longer arm of said lever to effect movement thereof, and means indicating the extent of movement of said manually operable means thereby providing an amplified indication of the position of the shorter arm of the lever, whereby the said first part of the apparatus may be accurately set to a predetermined position by actuating said manually operable means until the shorter arm of said lever is located in accordance with the desired position and then moving the said first part until the signal producing means and the optical system indicate alignment of the first-mentioned means and said indicium with that graduation on said scale corresponding with the said predetermined position of the first part.

22. In combination with an apparatus having a first part supported for linear movement with respect to a second part, a graduated scale fixed to one of said parts, a lever pivotally carried by the other of said parts, the said lever having arms of different lengths with the shorter arm movable adjacent said scale, means on said shorter arm successively alignable with the graduations on said scale upon relative movement therebetween, means for illuminating said scale, light responsive means providing a sensory perceptible sigal in response to said alignment, an indicium on said shorter lever arm, a screen, magnifying means intermediate the said scale and screen arranged to project an enlarged image of said indicium and a selected portion of said scale upon said screen, a rotatable helical cam surface cooperating with the longer arm of said lever to effect movement thereof the pitch of said cam surface and the ratio of said lever arms being such that the said shorter arm is movable a distance equal to the spacing between two adjacent graduations on said scale, and graduations adjacent the cam surface representative of the fine divisions of the space between two graduations on said scale and cooperating with said lever to provide an amplified indication of the position of the shorter arm of the lever whereby the said first part of the apparatus may be accurately set to a predetermined position by actuating said cam surface until the shorter arm of said lever is located in accordance with the desired position and then moving the said first part until the signal producing means and screen reveal alignment of the first-mentioned means and said indicium with that graduation on said scale corresponding with the said predetermined position of the first part.

23. A device of the character described for effecting predetermined registry of an image on an image receiving member comprising a support for the image receiving member, a support for the image producing means, means for linearly moving one of said supports relative to the other, a graduated scale fixed to one of said supports, a lever pivotally carried by the other of said supports, said lever having arms of different lengths with the shorter arm movable adjacent said scale, means on said shorter arm successively alignable with the graduations on said scale upon relative movement therebetween, means providing a sensory perceptible signal in response to said alignment, manually operable motion reduction means cooperating with the longer arm of said lever to effect movement thereof, and means indicating the extent of movement of said manually operable means thereby providing an amplified indication of the position of the shorter arm of the lever, whereby the movable support may be accurately set to a predetermined position by setting said manually operable means until the shorter arm of said lever is located in accordance with the desired position and then moving the said movable support until the said signal producing means is actuated in response to alignment with the first-mentioned means of that graduation on said scale corresponding with the said predetermined position of the support.

24. A device as defined in claim 23 wherein the said manually operable means is a rotatable drum provided with a helical cam surface cooperating with said lever to move the latter and the means indicating the extent of movement of the said manually operable means comprise graduations adjacent the said cam surface and reference point means on the longer arm of said lever for the last-mentioned graduations.

25. A device as defined in claim 23 and further comprising an indicium on the shorter arm of said lever, means for illuminating the said scale, a screen, and magnifying means intermediate the said scale and screen for projecting on said screen an enlarged image of said scale and indicium in juxtaposition.

WILLIAM C. HUEBNER.

REFERENCES CITED

The following references are of record in the file of this patent:

UNITED STATES PATENTS

| Number | Name | Date |
|---|---|---|
| 2,289,551 | Reason | July 14, 1942 |
| 2,373,989 | Wurger | Apr. 17, 1945 |